(12) United States Patent
Fritz et al.

(10) Patent No.: US 11,055,643 B2
(45) Date of Patent: Jul. 6, 2021

(54) SYSTEM AND METHOD FOR A PRESCRIPTIVE ENGINE

(71) Applicant: Samsung Electronics Co., Ltd., Suwon-si (KR)

(72) Inventors: Matthew Fritz, Dallas, TX (US); Venkata Pakkala, Frisco, TX (US); Mehmet Yunt, Richardson, TX (US); Santosh Chikoti, Secaucus, NJ (US); Saurabh Sharma, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 16/116,649

(22) Filed: Aug. 29, 2018

(65) Prior Publication Data

US 2019/0147387 A1 May 16, 2019

Related U.S. Application Data

(60) Provisional application No. 62/585,474, filed on Nov. 13, 2017.

(51) Int. Cl.
*G06Q 30/02* (2012.01)
*G06Q 10/06* (2012.01)

(52) U.S. Cl.
CPC . *G06Q 10/063112* (2013.01); *G06Q 10/0639* (2013.01); *G06Q 10/06375* (2013.01);
(Continued)

(58) Field of Classification Search
CPC ........ G06Q 10/00; G06Q 40/00; G06Q 40/06; G06Q 30/02; G06Q 30/0207; G06Q 30/0241
(Continued)

(56) References Cited

U.S. PATENT DOCUMENTS 5,515,098 A 5/1996 Carles
5,974,392 A * 10/1999 Endo .............. G06Q 10/063112
705/7.14
(Continued)

FOREIGN PATENT DOCUMENTS

KR 20020006197 A 1/2002
KR 1020100050817 A 5/2010
(Continued)

OTHER PUBLICATIONS

Leye et al (CCS-TA: Quality-Guaranteed Online Task Allocation in Compressive Crowdsensing), Sep. 2015, ResearchGate, pp. 1-12 (Year: 2015).*

(Continued)

*Primary Examiner* — Romain Jeanty

(57) ABSTRACT

The present disclosure includes a prescriptive engine system and a method of using the prescriptive engine system. The method includes receiving information on actions and receiving information on participants, the information on the participants including first suitability information of at least one participant for at least one of the actions, generating, based on the first suitability information, second suitability information for a set of participants for at least one action, allocating, based on the second suitability information, the at least one action to the set of participants, deploying the at least one action to the set of participants, receiving, after the at least one action has been performed, results of the at least one action for each participant in the set of participants, and updating, based on the received results, the first suitability information of each participant in the set of participants for the at least one action.

20 Claims, 3 Drawing Sheets

(52) U.S. Cl.
CPC ..... *G06Q 10/063114* (2013.01); *G06Q 30/02* (2013.01); *G06Q 30/0207* (2013.01); *G06Q 30/0241* (2013.01)

(58) Field of Classification Search
USPC .............................................. 705/7.21, 7.14
See application file for complete search history.

(56) References Cited

U.S. PATENT DOCUMENTS

| | | | | |
|---|---|---|---|---|
| 6,859,927 | B2* | 2/2005 | Moody | G06Q 10/06 718/100 |
| 7,080,057 | B2* | 7/2006 | Scarborough | G06Q 10/063 706/60 |
| 8,306,841 | B2* | 11/2012 | Clarke | G06Q 10/063118 705/7.23 |
| 9,075,870 | B2 | 7/2015 | Lee | |
| 9,367,603 | B2 | 6/2016 | Keng et al. | |
| 9,466,039 | B2* | 10/2016 | Gatti | G06Q 10/06 |
| 9,466,069 | B2 | 10/2016 | Paulson et al. | |
| 10,456,912 | B2* | 10/2019 | Baroudi | B25J 9/1602 |
| 2006/0195379 | A1* | 8/2006 | Abecassis | G06Q 30/02 705/35 |
| 2008/0244605 | A1* | 10/2008 | Bennington | G06Q 10/063112 705/7.14 |
| 2012/0059744 | A1* | 3/2012 | Abecassis | G06Q 30/02 705/30 |
| 2012/0215578 | A1* | 8/2012 | Swierz, III | G06Q 50/205 705/7.14 |
| 2013/0317871 | A1* | 11/2013 | Kulkarni | G06Q 10/063112 705/7.14 |
| 2014/0122144 | A1* | 5/2014 | Cirpus | G06Q 10/06 705/7.14 |
| 2014/0142998 | A1* | 5/2014 | Kroeger | G06Q 10/06311 705/7.13 |
| 2014/0244351 | A1 | 8/2014 | Symons | |
| 2014/0297548 | A1* | 10/2014 | Wilner | G06Q 10/1053 705/321 |
| 2015/0331914 | A1 | 11/2015 | Cherukuri | |
| 2016/0078479 | A1 | 3/2016 | Haugen et al. | |
| 2016/0162478 | A1* | 6/2016 | Blassin | G06Q 10/063112 706/12 |
| 2016/0217410 | A1* | 7/2016 | Santos | G06Q 10/063112 |
| 2016/0342911 | A1 | 11/2016 | Kannan et al. | |

FOREIGN PATENT DOCUMENTS

| | | |
|---|---|---|
| KR | 1020130105200 A | 9/2013 |
| KR | 1020130109630 A | 10/2013 |
| KR | 1020160027575 A | 3/2016 |

OTHER PUBLICATIONS

Tim et al (Dynamic Task-Allocation for unmanned Systems), Dec. 2014, Virginia Commonwealth University, pp. 1-106 (Year: 2014).*
Onn et al (Methods for task allocation via agent coalition formation), Apr. 1997, Artificial Intelligence, pp. 165-200, (Year: 2014).*
Sebastien et al "Task Allocation Learning in a Multiagent Environment: Application to the RoboCupRescue Simulation", 132010. Computer Science and Software Engineering Dept Laval University, Québec, PQ, Canada, pp. 1-26 (Year: 2010).*

* cited by examiner

SYSTEM AND METHOD FOR A PRESCRIPTIVE ENGINE

CROSS-REFERENCE TO RELATED APPLICATION AND CLAIM OF PRIORITY

This application claims priority under 35 U.S.C. § 119(e) to U.S. Provisional Patent Application No. 62/585,474 filed on Nov. 13, 2017. The above-identified provisional patent application is hereby incorporated by reference in its entirety.

TECHNICAL FIELD

This disclosure relates generally to computing optimization. More specifically, this disclosure relates to a method and system for a prescriptive engine.

BACKGROUND

Businesses have access to large amounts of data and predictive models that are used to determine the optimal way to assign business resources to achieve a desired task. The amount of data available inherently makes using that data effectively a complicated task. More specifically, prediction of which assets to allocate particular actions to in order to achieve desired objectives, especially when accounting for multiple actions across multiple assets with multiple constraints and desired objectives, is a complicated task.

SUMMARY

This disclosure provides a method and system for a prescriptive engine for action targeting optimization.

In a first embodiment, a method includes receiving information on one or more actions, and receiving information on one or more participants, the information on the one or more participants including first suitability information of at least one participant for at least one of the one or more actions. The method further includes generating, based on at least some of the first suitability information of the at least one participant, second suitability information for a set of participants of the one or more participants for at least one action of the one or more actions, allocating, based on the second suitability information for the set of participants for the at least one action, the at least one action to the set of participants, deploying the at least one action to the set of participants, receiving, after the at least one action has been performed, results of the at least one action for each participant in the set of participants, and updating, based on the received results, the first suitability information of each participant in the set of participants for the at least one action.

In a second embodiment, a system includes at least one database containing information on one or more actions and information on one or more participants, the information on the one or more participants including first suitability information of at least one participant for at least one of the one or more actions, and a prescriptive engine. The prescriptive engine is configured to receive the information on the one or more actions, receive the information on the one or more participants, generate, based on at least some of the first suitability information of the at least one participant, second suitability information for a set of participants of the one or more participants for at least one action of the one or more actions, allocate, based on the second suitability information for the set of participants for the at least one action, the at least one action to the set of participants, deploy the at least one action to the set of participants, receive, after the at least one action has been performed, results of the at least one action for each participant in the set of participants, and update, based on the received results, the first suitability information of each participant in the set of participants for the at least one action.

In a third embodiment, a non-transitory computer readable medium embodies a computer program, the computer program including computer readable program code that when executed causes at least one processing device to receive information on one or more actions, receive information on one or more participants, the information on the one or more participants including first suitability information of at least one participant for at least one of the one or more actions, generate, based on at least some of the first suitability information of the at least one participant, second suitability information for a set of participants of the one or more participants for at least one action of the one or more actions, allocate, based on the second suitability information for the set of participants for the at least one action, the at least one action to the set of participants, deploy the at least one action to the set of participants, receive, after the at least one action has been performed, results of the at least one action for each participant in the set of participants, and update, based on the received results, the first suitability information of each participant in the set of participants for the at least one action.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
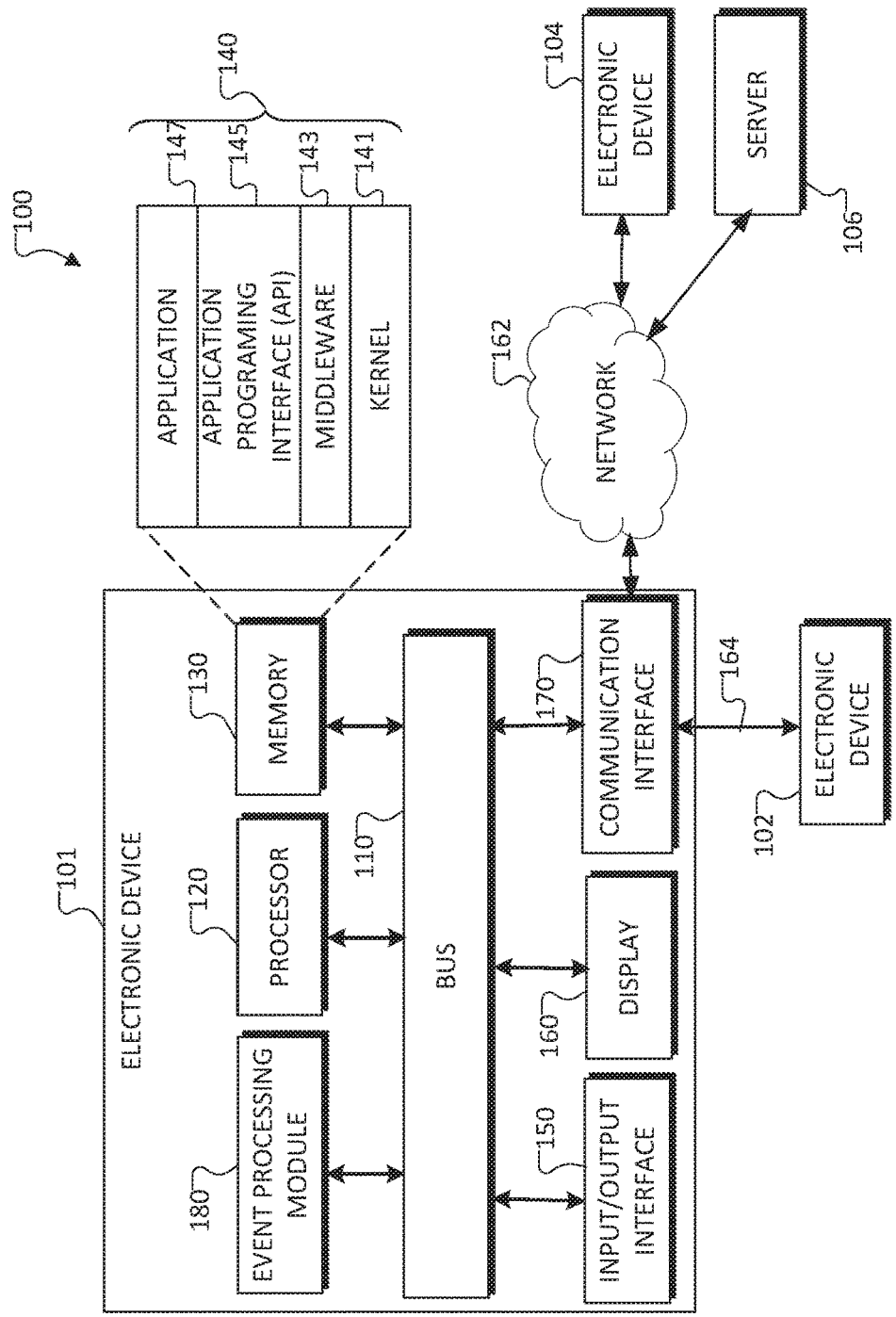
FIG. 1 illustrates an example computer system according to this disclosure.
Figure 2:
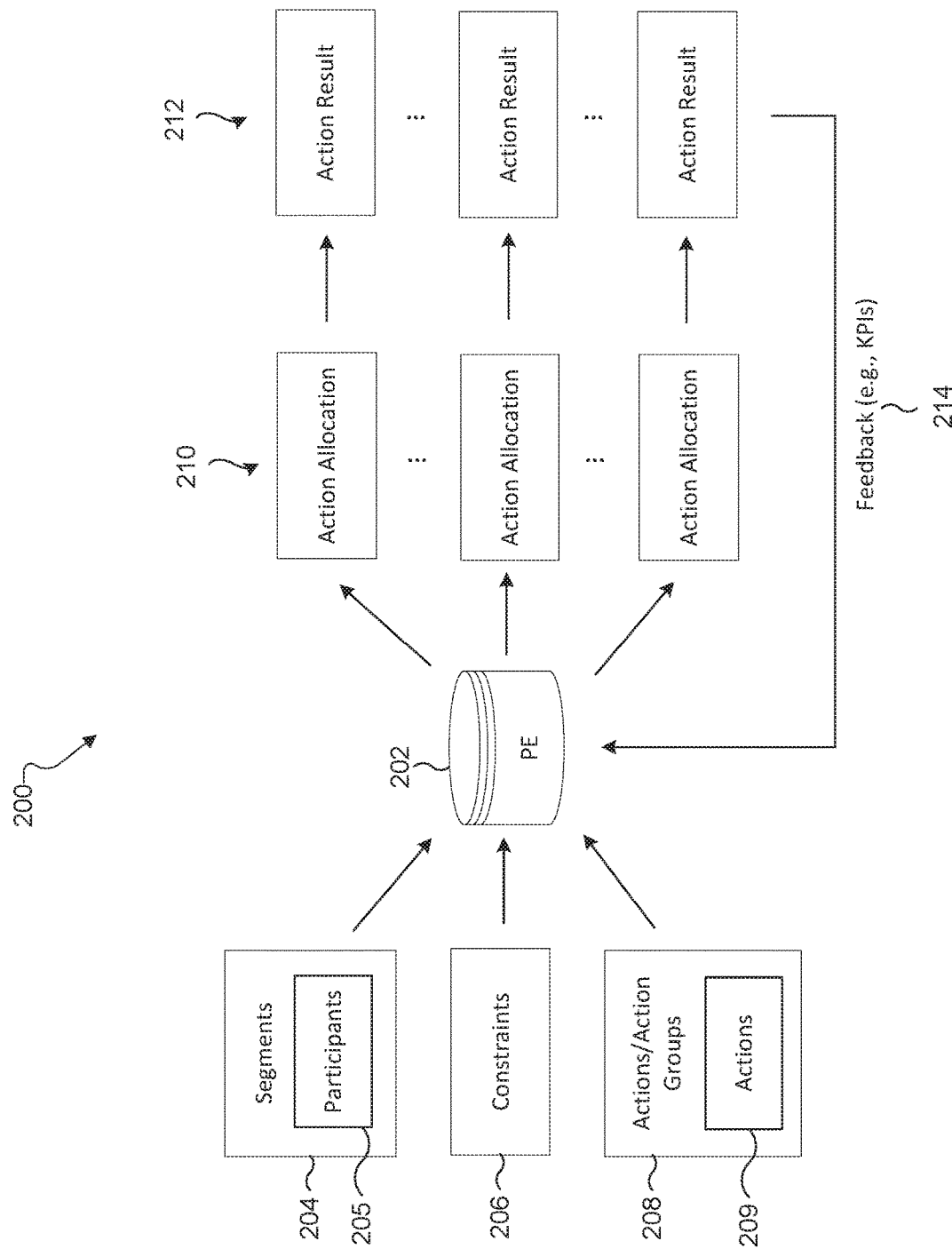
FIG. 2 illustrates an example prescriptive engine system according to this disclosure.
Figure 3:
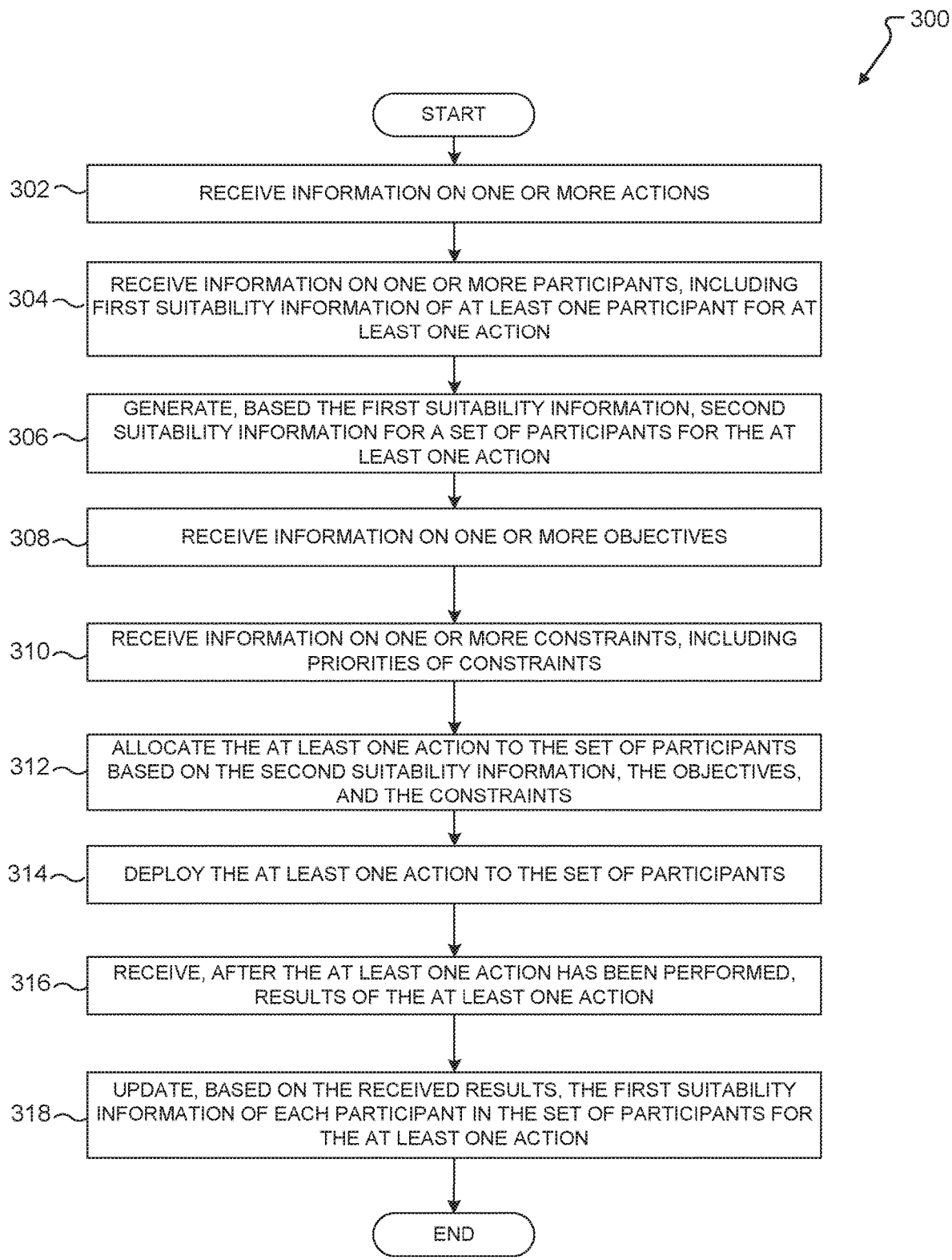
FIG. 3 illustrates an example method of a prescriptive engine for allocating actions and updating suitability hypotheses according to this disclosure.

FIGS. 1 through 3, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The present disclosure contemplates that in various applications it is useful to allocate multiple tasks (or actions) to actors (or participants) best suited for those tasks. For example, in a distributed computing environment that includes various different computing devices, different sets of those computing devices could be better suited to particular computing tasks than other sets of computing devices are, and accordingly it would be beneficial to automatically determine an optimal allocation of task to computing device. In another example, in a customer engagement system, some customers may react more positively to a certain type of advertisement or incentive than other customers, and accordingly automatic determination of which customer to allocate which advertising action to for optimal results would be beneficial.

To make this allocation, a prescriptive engine is disclosed that begins from an initial hypothesis about which participant will most optimally perform a given task (or react to a given task being performed on them) and works to determine a "true" optimal pairing of task to participant. Given an initial hypothesis about the probability that a given participant should be allocated a given task (e.g., participant A is 5% likely to react positively to task X) the prescriptive engine tests this hypothesis to find a "true" probability that each participant will react positively to each task.

More specifically, as described further below, the prescriptive engine generates a modified hypothesis from the initial hypothesis (e.g., assume participant A is 7% likely to be optimal for task X), allocates tasks to participants based on the modified hypothesis, deploys the task to the participants, measures the results of performance of each task (for example, by analyzing key performance indicators (KPIs) of the results), and adjusts the initial hypothesis accordingly. Formation of the new hypothesis can be done, in some embodiments, using Thompson Sampling. The prescriptive engine can repeat this process to converge on a "true" set of optimal assignments of tasks to participants.

In some embodiments, participants are grouped into "roles" or "segments" based on similar characteristics. For example, in a distributed computing environment, sets of devices could be segmented based on their processing hardware. In another embodiment, in an industrial production facility, sets of equipment in the facility could have multiple settings that could be segmented based on suitability for different production tasks (e.g., based on output volume vs. maintenance cost or risk of failure). In another embodiment, sets of customers in a customer engagement program could be segmented based on previously-exhibited characteristics such as brand loyalty, buying on sale only, etc. The prescriptive engine could assign actions to all participants in a selected role or segment rather than to individual participants. In some embodiments, a "role" could designate a broad subset of participants, and "segments" could be further subsets of participants within a role. For example, a set of participants in a customer service program could be divided into "big spender," "loyal," and "deal seeker" roles. Within a role (such as "big spender"), participants could be further subdivided into segments based on, for example, product groups they are interested in (such as mobile devices, TVs, or wearables).

FIG. 1 illustrates an example computer system 100 according to this disclosure. The computer system 100 includes an electronic device 101. The electronic device 101 can include at least one of a bus 110, a processor 120, a memory 130, an input/output interface 150, a display 160, a communication interface 170, or an event processing module 180. In some embodiments, the electronic device 101 may exclude at least one of the components or may include additional components.

The bus 110 can include a circuit for connecting the components 120 to 180 with one another and transferring communications (e.g., control messages and/or data) between the components. The processor 120 can include one or more of a central processing unit (CPU), an application processor (AP), or a communication processor (CP). The processor 120 can perform control on at least one of the other components of the electronic device 101, and/or perform various operations or data processing.

The memory 130 can include a volatile or non-volatile memory. For example, the memory 130 can store commands or data related to at least one other component of the electronic device 101. In some embodiments, the memory 130 can store software and/or a program 140. The program 140 can include, e.g., a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (e.g., the bus 110, processor 120, or a memory 130) used to perform operations or functions implemented in other programs (e.g., the middleware 143, API 145, or applications 147). The kernel 141 can provide an interface that allows the middleware 143, the API 145, or the applications 147 to access the individual components of the electronic device 101 to control or manage the system resources.

The middleware 143 can function as a relay to allow the API 145 or the applications 147 to communicate data with the kernel 141. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the applications 147 to control functions provided from the kernel 141 or the middleware 143. For example, the API 133 can include at least one interface or function (e.g., a command) for filing control, window control, image processing or text control.

The input/output interface 150 can serve as an interface that can, e.g., transfer commands or data input from a user or other external devices to other component(s) of the electronic device 101. Further, the input/output interface 150 can output commands or data received from other component(s) of the electronic device 101 to the user or the other external device.

The display 160 can include, e.g., a liquid crystal display (LCD), a light emitting diode (LED) display, an organic light emitting diode (OLED) display, a microelectromechanical systems (MEMS) display, or an electronic paper display. The display 160 can display, e.g., various contents (e.g., text, images, videos, icons, or symbols) to the user.

The communication interface 170 can set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic devices 102 or 104.

The network 162 can include at least one of communication networks, e.g., a computer network (e.g., local area network (LAN) or wide area network (WAN)), Internet, or a telephone network. The network 164 could include a direct network connection such as a direct wired connection, WIFI DIRECT, or BLUETOOTH.

The first and second external electronic devices 102 and 104 each can be a device of the same or a different type from the electronic device 101. In some embodiments, the server 106 can include a group of one or more servers. In some embodiments, all or some of the operations executed on the electronic device 101 can be executed on another or multiple other electronic devices (e.g., the electronic devices 102 and 104 or server 106). In some embodiments, when the electronic device 101 should perform some function or service automatically or in response to a request, the electronic device 101, instead of executing the function or service on its own or in addition to executing the function or service on its own, can request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101.

The electronic device 101 can provide a requested function or service by processing the received result as it is or it may perform additional processing. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 can in some embodiments be independently operated without a separate communication function.

The event processing module 180 can process at least part of information obtained from other elements (e.g., the processor 120, the memory 130, the input/output interface 150, or the communication interface 170) and can provide the same to the user in various manners. This information could include, for example, information on roles, segments, participants, actions, action groups, or KPIs of allocations of actions to participants. The event processing module 180 can perform operations according to embodiments of the present invention in interoperation with at least one program 140 stored in the memory 130. For example, the event processing module 180 could implement a prescriptive engine that receives as input data related to participants, segments of participants, and actions to be allocated to the participants, determines a suitability of each participant or segment of participants for a given action or group of actions, and allocates the action or group of actions to participants accordingly. The event processing module 180 could also receive feedback on previous allocations, for example in the form of KPIs drawn from results of the previous allocations, and could use that feedback to update its determination of suitability of the participants or segments for the actions or action groups. The event processing module 180 could also deploy allocated actions to participants, such as by initiating an action (for example, an email campaign) directed at participants, or by transmitting instructions to participants to perform an allocated action (for example, a distributed computing task). Although the event processing module 180 is shown to be a module separate from the processor 120, at least a portion of the event processing module 180 can be included or implemented in the processor 120 or at least one other module, or the overall function of the event processing module 180 can be included or implemented in the processor 120 shown or another processor.

Although FIG. 1 illustrates one example of a computing system, various changes may be made to FIG. 1. For example, the computing system 100 could contain more or fewer components. As a specific example, electronic device 101 could function without interfacing with server 106 or electronic devices 102 and 104.

FIG. 2 illustrates an example prescriptive engine system 200 according to this disclosure. In some embodiments, the prescriptive engine system 200 can be implemented using the computer system 100 of FIG. 1. For example, the prescriptive engine system 200 could be implemented on an electronic device 101 or using a distributed computing arrangement with two or more of electronic devices 101, 102, 104, or server 106.

The prescriptive engine system 200 includes a prescriptive engine 202. The prescriptive engine 202 automatically allocates (or prescribes) actions to participants based on constraints placed on the allocations, and evaluates the efficacy of those allocations to improve the outcomes of future allocations. The prescriptive engine 202 uses various inputs, such as a list of participants 205 (or segments 204 of participants 205), a list of constraints 206, and a list of actions 209 or action groups 208. In some embodiments, these inputs are contained in a database or other data structure.

Segmentation of participants 205 into segments 204 can be useful when there are a very large number of participants 205 (e.g., millions of customers in a customer service program) and it is not feasible to individually analyze each participant 205 for allocation of an action 209. In such cases, segmentation of participants 205 by common capabilities, behaviors, or traits (e.g., spending habits, previous purchases, previous responses to customer service campaigns) is useful to make allocation of actions manageable. Similarly, actions 209 can be broken down into a manageable number of actions (e.g., sending a discount to a customer, sending a gift card to a customer, sending a financing offer to a customer, sending a free product to a customer).

In some embodiments, different actions 209 may be allocated to different participants within a segment 204. For example, it may be useful to allocate multiple actions or action groups to a same segment 204 in order to evaluate the response of that segment to the actions, which in turn can be useful to more quickly determine a segment's probability to react positively to a given allocation. Similarly, multiple actions may be allocated at one time to a given participant in a segment (or to a subset of participants a segment). This can be useful to determine in one allocation how a participant segment responds to multiple given actions.

The prescriptive engine 202 has an initial set of information about the suitability of segments 204 for the actions 209 (which may be referred to as an initial suitability hypothesis). This initial suitability hypothesis could take the form of, for example, a probability of a "positive" result of allocation 210 of an action 209 to a segment 204. For example, the hypothesis could be that a participant 205 in a certain segment 204 will have a 5% chance to positively react to allocation of an action 209 (i.e., to be suitable for the action 209). This hypothesis can be input by a user of the system based on previously obtained data.

This hypothesis may not be representative of the "true" probability for the given segment 204 to react positively to allocation of the action 209. Accordingly, as will be further described below, the prescriptive engine 202, based on observed results 212 of action allocations, iterates on this hypothesis to search for the "true" probability of positive reaction of any given segment 204 to allocation 210 of any given action 209. This process can be referred to as exploration.

In some embodiments, the prescriptive engine 202 forms its initial suitability hypothesis by randomly assigning each participant or segment 204 a probability of a positive result for each action 209 or action group 208. That is, the prescriptive engine 202 can function with no initial information about the suitability of participants 205 for the actions 209, and can autonomously obtain information about the suitability of participants 205 for the actions 209 as described further below.

Based on the current suitability hypothesis, whether the initial suitability hypothesis or a hypothesis formed after multiple cycles of action allocation and feedback, the prescriptive engine 202 makes allocations 210 of actions 209 or action groups 208 to participants or segments 204. For example, if the hypothesis is that segment A is 9% likely to react favorably to action X, segment B is 3% likely to react favorably to action X, and segment C is 0% likely to react favorably to action X, the prescriptive engine 202 could allocate action X to participants of both segments A and B such that three times as many participants of segment A as participants of segment B are allocated action X.

After the allocations 210 are made, the allocations are deployed to the allocated participants so that the actions can be performed. In some embodiments, the action allocations 210 are actions 209 or action groups 208 that are taken by a participant 205 or segment 204. For example, in a distributed computing system, the action 209 could be various different types of computational loads, such as CPU-heavy computational loads, FPU-heavy computational loads, GPU-heavy computational loads, or the like, which are performed by the allocated participant 205 or segment 204. In such embodiments, deployment could include transmitting, to the allocated participants 205 or segments 204, instructions to perform the actions 209 or action groups 208 according to allocations 210. In some embodiments, the action allocations 210 are actions 209 that are taken on (or with respect to) a participant 205 or segment 204. For example, in a customer service program, an action 209 could be sending an email containing a coupon, sending a sale offer on a particular item, sending an advertisement about a new product release, or the like, which are sent to the allocated participant 205 or segment 204. In such embodiments, deployment could include initiating the action 209 or action group 208 on the participant 205 or segment 204.

After the actions of allocations 210 are performed, results 212 of the action allocations 210 are available to be measured and analyzed. The prescriptive engine 202 updates its suitability hypothesis based on feedback from the results 212 of allocations 210. In some embodiments, the results 212 can be received in the form of KPIs 214, or KPIs 214 can be generated by the prescriptive engine 202 or by some other intermediary device based on the results 212.

KPIs 214 can take a number of forms. For example, KPIs 214 could be binary, meaning that the result 212 of an action allocation 210 is represented by two values (e.g., positive or negative). In another example, the KPIs 214 could be numeric, meaning that a KPI 214 is a value on a continuum that represents the result 212 (e.g., a time taken to perform a calculation, a purchase amount, a delay between viewing an advertisement and clicking a link, etc.). In some cases, a KPI 214 could be constant, representing a fixed cost or fixed benefit of an action allocation 210. For simplicity, feedback will be discussed in terms of KPIs 214, but it is understood that other forms of feedback could be used.

In order to generate new hypotheses based on the KPIs 214, the prescriptive engine 202 first uses the KPIs 214 to update its knowledge of how each allocated participant or segment 204 responded to each action 209 that was allocated to them. For example, given a binary KPI 214, the prescriptive engine 202 could simply measure how many participants of the allocated segments 204 returned a positive KPI 214 and how many returned a negative KPI 214 for each action 209 that was allocated to them. If 7% of allocated participants of segments 204 resulted in positive KPIs 214, then the prescriptive engine 202 could update its hypothesis to reflect a 7% chance of positive result when participants of segments 204 are allocated the action 209.

After the above updated knowledge, the prescriptive engine 202 can refine allocations to better meet objectives by generating, based on the updated knowledge, a new hypothesis (e.g., a new probability) that each participant 205 or segment 204 will react favorably to allocation of a given action 209. For example, if the updated knowledge includes that participants 205 of segment 204 will be 7% likely to return a positive result when allocated an action 209, the prescriptive engine 202 could hypothesize that, in fact, 9% of participants 205 of segment 204 are likely to return a positive result when allocated an action 209. This new hypothesis (or set of new hypotheses for various actions and segments) can then be used to allocate actions 209, and the results 212 of this allocation 210 can be used to update the hypothesis (or hypotheses). In some embodiments, knowledge from some or all of the previous allocations can be used to create an updated hypothesis. In this way, a feedback loop is created that converges on a true suitability measure for various combinations of actions 209 and participants 205 or segments 204.

In some embodiments, when using knowledge from multiple previous allocations to create an updated hypothesis, a forgetting factor is used to discount the value of old knowledge when performing the above-described feedback. For example, a weighting factor could be applied to knowledge gained from each allocation, where the weighting factor causes old knowledge to be valued progressively less as it gets older. In some embodiments, a forgetting window (or memory window) could be used that entirely disregards knowledge past a certain threshold of age (e.g., knowledge from allocations that occurred 5 or more cycles ago is disregarded). In this way, structural changes in the segments 204 or the actions 209 can be accounted for, and errors from outdated knowledge will be removed.

In one example embodiment of the prescriptive engine 202, a "multi-armed bandit" model is used. The multi-armed bandit includes an update function and a segment selection function. The segment allocation (or segment selection) function performs the task of allocating an action 209 or action group 208 to a segment 204 (or any suitable set of participants 205). The update function uses feedback such as KPIs 214 to generate updated knowledge that can be accessed and used by the segment allocation function to refine future allocations 210 towards an optimal allocation 210.

As described above, an initial allocation can be performed by the segment allocation function based on an initial hypothesis. This initial hypothesis could be a naïve hypothesis that simply allocates actions 209 evenly across segments 204. For example, the prescriptive engine 202 could initially allocate each action 209 to an equal portion of each segment 204.

After the initial allocation 210, the actions will be performed, and there will be feedback data such as KPIs 214 available to the prescription engine 202 from results 212. The update function can update a running record of KPIs 214 for each allocation 210 that has been generated by the prescription engine 202. For example, in an embodiment using a binary KPI 214 (i.e., the KPI 214 corresponding to each result 212 is either a 1 or a 0, representing a positive or negative result, respectively), the update function can create a record of the number of positive results and the number of negative results from the most recent allocation 210 and append it to a record of the number of positive and negative results for previous allocations 210. In this way, the prescription engine 202 can have access to knowledge of the number of positive and negative results of each previous allocation 210.

In some embodiments, the update function does not expose the raw data on number of positive and negative results of all previous allocations to the prescription engine 202. Instead, the update function can sum the number of positive results and the number of negative results of previous allocations 210 and provide these sums to the prescription engine 202. A forgetting window can also be used to reduce or eliminate the impact of old allocations 210 on the next allocation 210. For example, when using a forgetting window of 4, the update function would only sum the positive results and negative results of the most recent 4 allocations 210 and provide that result to the prescription engine 202. Accordingly, the prescriptive engine 202's resulting allocation 210 would only take into account knowledge from the most recent 4 allocations 210.

Once the update function has provided (or made available) this updated knowledge to the prescription engine 202, the prescription engine 202 calculates estimated KPIs for possible future allocations 210 (i.e., estimated KPIs of each segment 204 if allocated each action 209 given the updated knowledge from previous allocations 210 that is provided by the update function), and selects a set of allocations 210 that maximize the estimated KPIs.

In a second example embodiment of the prescriptive engine 202, the updated hypothesis is selected from a distribution of probabilities that is generated based on the knowledge gained from the previous allocation (or from multiple previous allocations), and mixed integer linear programming (MILP) is used to perform allocation of actions 209 to participants 205 or segments 204. This model includes a parameter estimation function and an allocation function. Formation of the updated hypothesis can be done, in some embodiments, using Thompson Sampling. A hypothesis, as described above, can also be considered as an estimated rate of positive KPIs 214.

In an embodiment where KPIs 214 are binary KPIs (such as success or failure, represented by 1 or 0, respectively), it may be assumed that probability of a positive outcome (e.g., success) is Bernoulli distributed, and that a positive outcome probability p is governed by a beta distributed. Given n Bernoulli trials, getting p successes would then be governed by a beta-binomial distribution. In this case, for a specified segment 204 (or subset of participants 205 or segments 204) and action 209 or action group 208, the parameter estimation function can estimate a KPI rate for allocation of that action 209 to that segment 204 based on $\alpha_0$ (a prior $\alpha$ for the Beta distribution that is obtained from a default KPI rate supplied by a user), $\beta_0$ (a prior $\beta$ for the Beta distribution that is obtained from a default KPI rate supplied by a user), $n_d$ (the sum of the number of previous allocations discounted based on age), and $p_d$ (the sum of the number of successes in previous allocations discounted based on age). The estimated KPI rate is represented by $c=\text{Beta}(\alpha, \beta)$, where $\alpha=\alpha_0+p_d$ and $\beta=\beta_0+n_d-p_d$. This estimated KPI rate is the estimated probability of a positive outcome (i.e., the estimated probability that KPI will be 1) if action 209 is allocated to segment 204. The parameter estimation function can also determine a normalized mean value of the estimated KPI rate, which is useful for MILP as described below. An estimated mean KPI rate $$\bar{c} = \frac{\alpha}{\alpha + \beta}$$

and a variance of the estimated mean KPI rate $$\sigma^2 = \frac{\alpha \times \beta}{(\alpha + \beta + 1) \times (\alpha + \beta)^2}$$

are used to calculate the normalized mean $$z = \frac{c}{\sqrt{\sigma^2}}.$$

In an embodiment where KPIs 214 are numeric KPIs representing a continuous quantity of outcome (e.g., a score over a range of 0-100), for specified segments 204 (or subset of participants 205 or segments 204) and action 209 or action group 208, the parameter estimation function can estimate a KPI rate for allocation of that action 209 to that segment 204 as $$c = \frac{q_d}{n_d},$$

where $q_d$ is the sum of the quantities of the previous KPIs discounted based on age. In this case, if there is no prior historical information for the numeric KPI, $\alpha_0$ and $\beta_0$ are exclusively assigned. A normalized mean value of the estimated KPI rate, in this embodiment, can be calculated as $$z = \frac{c}{\sqrt{\sigma_M^2}},$$

where $\sigma_M^2$ is the sampling variance of the estimated KPI rate, defined as $$\sigma_M^2 = \frac{\sigma^2}{n_d},$$

and $\sigma^2$ is the variance of the estimated KPI rate defined as $$\sigma^2 = \frac{q_d^2 - n_d \times c^2}{n_d - 1}.$$

In the above embodiments, discounting of the number of allocations, the number of positive outcomes, and the quantity is performed based on a forgetting factor $\gamma$. For example, $n_d$ could be determined as $n_d = \Sigma_i^{nD}(n_i \times e^{-(t_0-t_i)/\gamma})$ for D previous allocations, where $t_i$ is the time of collection of results data on the $i^{th}$ allocation. Similarly, $p_d$ could be determined as $p_d = \Sigma_i^{nD}(p_i \times e^{-(t_0-t_i)/\gamma})$ for D previous allocations, and $q_d$ could be determined as $q_d = \Sigma_i^{nD}(q_i \times e^{-(t_0-t_i)/\gamma})$ for D previous allocations. Following from this, $q_d^2$ is determined as $q_d^2 = \Sigma_i^{nD}(q_i^2 \times e^{-(t_0-t_i)/\gamma})$. Accordingly a smaller forgetting factor $\gamma$ means that knowledge from previous allocations is discounted more quickly.

The parameter estimation function additionally facilitates use of MILP by calculating a set of exploration constraints based on the normalized mean values of estimated KPI rates. For example, the parameter estimation function could map the inverse of the normalized mean values to an interval between 0 and 1, where 1 represents the highest uncertainty in the estimated KPI rate. The resulting value can be referred to as an e-index. These e-indices decrease toward 0 (i.e., they represent less uncertainty in the estimated KPI rate) as more segments 204 and actions 209 or action groups 208 are used. If numeric KPIs are used, the sampling variance $\sigma_M^2$ of the estimated KPI rate decreases toward 0, and if binary KPIs are used, the variance $\sigma^2$ of the estimated mean KPI rate decreases toward 0. The parameter estimation function uses a forgetting factor to increase the variance gradually, forcing the e-index to become non-zero, which induces further exploration in order to reduce the variance back to zero.

The parameter estimation unit then determines a maximum e-index for each combination of actions 209 or action groups 208 and segments 204. The average of the maximum e-indices is determined over segments 204 and actions 209 or action groups 208, respectively. These averages are numbers between 0 and 1 that determine what fraction of segments 204, action, or group of actions 209 needs to be allocated for exploration. The parameter estimation unit determines different normalized e-indices for the actions 209 or action groups 208 and for the segments 204 by normalizing across the actions 209 or action groups 208 and the segments 204. These normalized e-indices are used to determine the fraction of exploration-allocated participants 205 of a segment 204 or the fraction of exploration-allocated action 209 or action group 208 that are allocated to a given combination of the segments 204 and the action 209 or action group 208.

Those allocations are computed for segments 204 and action groups 208 separately using the forgetting factor and the maximum e-indices, and the minimum value is taken as the exploration allocation amount for a given pairing of segments 204 and action 209 or action group 208. The allocation function can be used to solve a dummy MILP problem (e.g., with a very simple objective) using the exploration constraints, including the exploration allocation amount, to determine if it is feasible to find a solution to the dummy MILP problem under the exploration constraints. If the exploration constraints are not feasible, they may be relaxed before being used by the allocation function.

Once the parameter estimation function has estimated KPIs and determined exploration constraints, the allocation function uses those estimated KPIs and exploration constraints along with a set of objectives and constraints and information on the segments 204 to allocate actions 209 or action groups 208 to segments 204 (or to subsets of participants 205 within segments 204) using MILP. The MILP algorithm can simultaneously consider allocations of different actions 209 or action groups 208 to segments 204 or subsets of participants 205 in order to generate a "plan," which is a collection of allocations 210 of the full set of actions 209 or action groups 208 to segments 204 or subsets of participants 205. That is, the MILP algorithm balances different objectives and constraints against each other, relaxing constraints where possible, to generate a plan of allocations 210 that optimizes achievement of the supplied objectives.

Constraints can include, for example, business requirements such as limits on a number of actions 209 that can be taken, total cost of actions 209, and the like. In some embodiments, it is recognized that constraints cannot always be satisfied, in which case some constraints can be relaxed to satisfy other constraints. A user can specify which constraints can be relaxed and which cannot, and an order of importance for constraints. Example constraints include "get more than 100 positive results from allocated actions," or "the total cost of allocated actions should be less than $1000," or "do not allocate actions X or Y to segments A or B." The allocation function solves the dummy MILP problem using the user-provided constraints to determine if it is feasible to solve the MILP problem under these constraints (i.e., to determine if the constraints are feasible). If any constraints are not feasible, and can be relaxed, then they are relaxed. If the constraints have an order of importance, those that are ranked as less important are relaxed before those that are ranked as more important. If the user has indicated that a constraint cannot be relaxed, and that constraint is infeasible, then the process may abort.

Objectives include quantifiable goals, for example goals quantifiable in terms of KPIs 214 and allocations 210. Multiple objectives can be specified with an order of importance specified by a user (for example, as a weighting factor on the objectives). In some cases, an objective is sought to be minimized, while in other cases an objective is sought to be maximized. Example objectives include "maximize the number of positive results of Action X," or "maximize the rate of positive results of Actions X and Y." The allocation function can solve the MILP problem using these objectives without applying any constraints to determine upper and lower bounds on each user-provided objective. The allocation function can then normalize each objective based on these upper and lower bounds.

The allocation function can then solve the MILP problem again, this time applying the relaxed user specified constraints along with the objectives to determine upper and lower bounds on the objective, which can be used to again to normalize the corresponding objective. The allocation function can next solve the MILP problem using a combined objective for all relaxed exploration constraints in order to find upper and lower bounds on the combined objective.

The allocation function assembles final objectives as a weighted sum of user-provided objectives, relaxed user-provided constraints, and exploration constraints. In some embodiments, the weights are the order or importance of the objective that can be specified by a user. The allocation function then solves the MILP problem based on these final objectives, producing a plan for allocation of all of the actions 209 or action groups 208 to segments 204 that maximizes the objectives. As noted above, maximization of the objectives could include sacrificing lower priority objectives to improve higher priority objectives. In accordance with the above examples, the objectives could be measured by KPIs 214, and maximizing an objective could mean maximizing (or minimizing) a KPI 214 for that objective.

For example, an allocation of action X to 7,000 participants of segment A and to 10,000 participants of segment B and an allocation of action Y to 3,000 participants of segment A and 1,000 participants of segment B could satisfy objectives for action X and for action Y result in a highest total objective satisfaction. Alternatively, action X could be an action group consisting of actions X1 and X2, which are both allocated at the same time to the 7,000 participants of segment A and to the 10,000 participants of segment B. In some embodiments, allocation of action groups can account for distinct permutations of action groups (for example, an action group consisting of performing action X1 and then action X2 could be different from an action group consisting of performing action X2 and then action X1).

After the allocation is done, results 212 are measured and feedback is generated, for example in the form of KPIs 214. As described above, these KPIs 214 can be used to provide feedback to the prescriptive engine 202 to further refine information on the suitability of segments 204 for actions 209 or action groups 208, which in turn allows the next allocation to further maximize objectives, until the prescriptive engine 202 converges on a suitability hypothesis that matches the observed results to an acceptable degree. At this point, the prescriptive engine 202 can be said to have found the true suitability of that particular allocation.

Although FIG. 2 illustrates one example of a prescriptive engine system, various changes may be made to FIG. 2. For example, the prescriptive engine 202 could be implemented across multiple separate devices. As a specific example, one device could receive KPIs 214 and perform the functions of the update function or the parameter estimation function, and that device could pass the results of the update function or the parameter estimation function to a second device that performs the allocation function. As another example, different methods of estimating KPIs could be used.

FIG. 3 illustrates an example method 300 of a prescriptive engine for allocating actions and updating suitability hypotheses according to this disclosure. The method 300 could be implemented using the prescriptive engine 202 and the prescriptive engine system 200. The method 300 could also be implemented on an electronic device 101.

Beginning at step 302, the prescriptive engine receives information on one or more actions to be allocated to one or more participants. The actions could be grouped into action groups, such that any allocation of an action group to a participant requires allocation of all actions within the action group to the participant.

At step 304, the prescriptive engine receives information on one or more participants. The information includes first suitability information of at least one participant for at least one of the actions. The first suitability information is based on the results or outcomes of a number of most recent allocations of the at least one action to the one or more participants. In some embodiments, there is no first suitability information (for example, when the at least one action has not been allocated to the one or more participants previously). In such cases, the prescriptive engine generates an estimated first suitability information.

At step 306, the prescriptive engine generates second suitability information for a set of participants for the at least one action. The second suitability information is generated based on the first suitability information. Generating the second suitability information can include generating an estimated probability of achieving a desired outcome of the at least one action when the at least one action is allocated to the set of participants.

At step 308, the prescriptive engine receives one or more objectives for the one or more actions. The one or more objectives are related to a desired outcome for each of the one or more actions. The objectives could be received from a user input, or from a database. As discussed above, the objectives could include target values of KPIs.

At step 310, the prescriptive engine receives information on one or more constraints for the at least one action. The constraints can include constraints on KPIs, constraints on costs, or the like. The constraints can have a priority ranking (e.g., each constraint is given a distinct priority compared to other constraints).

At step 312, the prescriptive engine allocates the at least one action to the set of participants based on the second suitability information. The allocation can also include consideration of the objectives and the constraints. For example, the allocation can be made so as to maximize one or more of the objectives subject to the constraints. If any of the constraints conflict with each other, constraints with lower priority will be relaxed so that constraints with higher priority can be met. In some cases, this can mean ignoring a lower priority constraint to fulfill a higher priority constraint. The allocation can, in some embodiments, be made to a subset of participants from the set of participants.

At step 314, the prescriptive engine deploys the allocation to the set of participants. The allocated actions are then performed. In some embodiments, the participants perform the allocated actions. For example, in a distributed computing system, the allocated actions could be computing tasks that are allocated to different computing devices to be performed. In other embodiments, the actions are performed on the participants (or with respect to the participants). For example, in a customer retention program, the actions could be customer retention campaigns that are performed with respect to participants.

At step 316, the prescriptive engine receives results of the at least one action, for each participant in the set of participants, after it has been performed (either by or on the allocated participants). The results of the at least one action include an indication of whether a desired outcome of the at least one action was achieved. As discussed above, this could be in the form of a KPI. If a binary KPI is used, the results indicate either a positive or negative result. If a numeric KPI is used, the results can be a value on a continuum that represents a degree of desired outcome that has been achieved.

At step 318, the prescriptive engine updates, based on the received results, the first suitability information of each participant in the set of participants for the at least one action. This includes estimating a probability of achieving the desired outcome of the at least one action when the at least one action is allocated to the participant.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for automated task allocation by a processor in a computing system, the method comprising:
   receiving, by the processor, information on one or more actions;
   obtaining, from a memory coupled to the processor, information on one or more participants, the information on the one or more participants including first suitability information of at least one participant for at least one of the one or more actions;
   generating, by the processor, based on at least some of the first suitability information of the at least one participant, second suitability information for a set of participants of the one or more participants for at least one action of the one or more actions, the second suitability information comprising a computed probability function regarding the set of participants and the at least one action;
   allocating, by the processor, based on the second suitability information for the set of participants for the at least one action, the at least one action to the set of participants;
   transmitting, to the set of participants and based on the allocation, a first signal associated the at least one action;
   receiving, by the processor, after the at least one action has been performed, an action signal comprising an indicator value representing results of the at least one action for each participant in the set of participants; and
   adjusting, by the processor, based on the indicator value, the computed probability function and first suitability information of each participant in the set of participants for the at least one action.

2. The method of claim 1, wherein generating the second suitability information for the set of participants for the at least one action includes generating an estimated probability of achieving a desired outcome of the at least one action when the at least one action is allocated to the set of participants.

3. The method of claim 1, further comprising:
   receiving, by the processor, information on one or more objectives for the one or more actions,
   wherein allocating the at least one action to the set of participants is also based on at least one objective from the one or more objectives.

4. The method of claim 3, wherein:
   the one or more objectives are related to a desired outcome for each of the one or more actions, and
   allocating the at least one action to the set of participants maximizes the at least one objective.

5. The method of claim 1, further comprising:
   receiving, by the processor, information on one or more constraints for the at least one action of the one or more actions,
   wherein allocating the at least one action to the set of participants is also based on at least one constraint from the one or more constraints.

6. The method of claim 1, further comprising:
   receiving, by the processor, information on one or more constraints for the at least one action of the one or more actions, wherein a first constraint of the one or more constraints has a first priority and a second constraint of the one or more constraints has a second priority; and
   ignoring, by the processor, the second constraint when the first priority is greater than the second priority and the first constraint conflicts with the second constraint.

7. The method of claim 1, wherein allocating the at least one action to the set of participants includes allocating the at least one action to only a subset of participants from the set of participants.

8. The method of claim 1, wherein:
   the indicator value includes an indication of whether a desired outcome of the at least one action was achieved, and
   updating the first suitability information of each participant in the set of participants for the at least one action includes updating an estimated probability of achieving the desired outcome of the at least one action when the at least one action is allocated to the at least one participant.

9. The method of claim 1, wherein the first suitability information is based on outcomes of a number of most recent allocations of the one or more actions to the one or more participants.

10. The method of claim 1, wherein the allocated at least one action is performed on the set of participants.

11. The method of claim 1, wherein the allocated at least one action is performed by the set of participants.

12. An apparatus comprising:
   at least one memory containing information on one or more actions and information on one or more participants, the information on the one or more participants including first suitability information of at least one participant for at least one of the one or more actions; and
   a processor configured to perform automated task allocation by:
      receiving the information on the one or more actions;
      extracting the first suitability information from the information on the one or more participants;

generating, based on at least some of the first suitability information of the at least one participant, second suitability information for a set of participants of the one or more participants for at least one action of the one or more actions, the second suitability information comprising a computed probability function regarding the set of participants and the at least one action;

allocating based on the second suitability information for the set of participants for the at least one action, the at least one action to the set of participants;

transmitting, to the set of participants and based on the allocation, a first signal associated with the at least one action;

receiving, after the at least one action has been performed, an action signal comprising an indicator value representing results of the at least one action for each participant in the set of participants; and updating, based on the indicator value, the computed probability function and first suitability information of each participant in the set of participants for the at least one action.

13. The apparatus of claim 12, wherein the processor is further configured to generate an estimated probability of achieving a desired outcome of the at least one action when the at least one action is allocated to the set of participants.

14. The apparatus of claim 12, wherein the processor is further configured to:

receive information on one or more objectives for the one or more actions, wherein allocating the at least one action to the set of participants is also based on at least one objective from the one or more objectives.

15. The apparatus of claim 12, wherein the processor is further configured to:

receive information on one or more constraints for the at least one action of the one or more actions, wherein allocating the at least one action to the set of participants is also based on at least one constraint from the one or more constraints.

16. The apparatus of claim 12, wherein:

the indicator value includes an indication of whether a desired outcome of the at least one action was achieved, and updating the first suitability information of each participant in the set of participants for the at least one action includes updating an estimated probability of achieving the desired outcome of the at least one action when the at least one action is allocated to the at least one participant.

17. A non-transitory computer readable medium embodying a computer program for automated task allocation by at least one processing device, the computer program comprising computer readable program code that when executed causes the at least one processing device to:

receive information on one or more actions;

obtain information on one or more participants, the information on the one or more participants including first suitability information of at least one participant for at least one of the one or more actions;

generate, based on at least some of the first suitability information of the at least one participant, second suitability information for a set of participants of the one or more participants for at least one action of the one or more actions, the second suitability information comprising a computed probability function regarding the set of participants and the at least one action;

allocate, based on the second suitability information for the set of participants for the at least one action, the at least one action to the set of participants;

transmit, to the set of participants and based on the allocation, a first signal associated with the at least one action;

receive, after the at least one action has been performed, an action signal comprising an indicator value representing results of the at least one action for each participant in the set of participants; and adjust, based on the indicator value, the computed probability function and first suitability information of each participant in the set of participants for the at least one action.

18. The non-transitory computer readable medium of claim 17, wherein the computer readable program code when executed causes the at least one processing device to generate an estimated probability of achieving a desired outcome of the at least one action when the at least one action is allocated to the set of participants.

19. The non-transitory computer readable medium of claim 17, wherein the computer readable program code when executed causes the at least one processing device to:

receive information on one or more objectives for the one or more actions, wherein allocating the at least one action to the set of participants is also based on at least one objective from the one or more objectives.

20. The non-transitory computer readable medium of claim 17, wherein the computer readable program code when executed causes the at least one processing device to:

receive information on one or more constraints for the at least one action of the one or more actions, wherein allocating the at least one action to the set of participants is also based on at least one constraint from the one or more constraints.

* * * * *